United States Patent [19]

Kato

[11] Patent Number: 4,784,794

[45] Date of Patent: Nov. 15, 1988

[54] HIGH-DISPERSION SOL OR GEL OF MONOCLINIC ZIRCONIA SUPERMICROCRYSTALS AND PRODUCTION OF THE SAME

[75] Inventor: Etsuro Kato, Aichi, Japan

[73] Assignee: Nissan Chemical Industries, Ltd., Tokyo, Japan

[21] Appl. No.: 3,279

[22] Filed: Jan. 14, 1987

[30] Foreign Application Priority Data

Jan. 14, 1986 [JP] Japan .................................. 61-5899

[51] Int. Cl.$^4$ .............................................. B01J 13/00
[52] U.S. Cl. ............................. 252/313.1; 252/315.01; 106/286.4; 423/70; 423/85
[58] Field of Search ....................... 252/313.1, 315.01; 106/286.4; 423/70, 85

[56] References Cited

U.S. PATENT DOCUMENTS

| | | | |
|---|---|---|---|
| 2,984,628 | 5/1961 | Alexander et al. | 252/313.1 |
| 3,110,681 | 11/1963 | Meadows et al. | 252/313.1 |
| 3,259,585 | 7/1966 | Fitch et al. | 252/313.1 |
| 3,282,857 | 11/1966 | Fitch et al. | 252/313.1 |
| 3,442,817 | 5/1969 | Luebke | 252/313.1 |
| 3,645,910 | 2/1972 | Woodhead | 252/313.1 |
| 4,619,817 | 10/1986 | Stambaugh et al. | 423/266 |
| 4,664,894 | 5/1987 | Suzuki et al. | 423/265 |

*Primary Examiner*—Matthew A. Thexton
*Attorney, Agent, or Firm*—Birch, Stewart, Kolasch & Birch

[57] ABSTRACT

Disclosed herein is a high-dispersion sol of monoclinic zirconia supermicrocrystals which is translucent and contains monoclinic zirconia supermicrocrystals of uniform size and a rodlike shape or ellipsoidal shape having a diameter or width smaller than 100 Å, at a concentration higher than 0.1 mol/liter. The sol is produced by preparing a clear or sherbetlike mixture of water and zirconyl chloride or an aqueous solution of a zirconium salt of hydroxide and hydrochloric acid, subjecting the mixture or the aqueous solution to hydrothermal treatment in a sealed container at more than 130° C. for more than 24 hours, to give a white pasty product, diluting the pasty product with water so that the concentration decreases below 1 mol/liter as zirconium, adjusting the pH to 3 to 7, and finally concentrating the diluted product.

18 Claims, No Drawings

HIGH-DISPERSION SOL OR GEL OF MONOCLINIC ZIRCONIA SUPERMICROCRYSTALS AND PRODUCTION OF THE SAME

BACKGROUND OF THE INVENTION

1. Field of the Invention

The present invention relates to a high-dispersion sol or gel of monoclinic zirconia supermicrocrystals having a diameter smaller than 100 Å which has never been known before, and a method of producing the same. More particularly, it relates to a high-dispersion sol or gel of monoclinic zirconia supermicrocrystals, said sol or gel containing monoclinic zirconia supermicrocrystals of extremely fine and uniform rodlike shape or ellipsoidal shape smaller than 100 Å in diameter or width, in a concentration higher than 0.1 mol/liter and a method of producing the same. The term "zirconia" used herein denotes what is commonly meant by zirconia which consists of $ZrO_2$ or contains $ZrO_2$ with a small amount of other metal oxides such as $HfO_2$ in the form of solid solution.

2. Description of the Prior Art:

Sol dispersions of monoclinic zirconia microcrystals have been available in various forms; however, they are mostly sols of agglomerate secondary particles. Even in the case of sol composed of discrete particles, the size of the particle is greater than 100 Å. There has not yet been produced high dispersion sol of supermicrocrystals smaller than 100 Å.

There is a known process of producing a hydrosol of zirconia by heating an aqueous solution of a zirconium salt at 120° to 300° C. under a hydrothermal condition (U.S. Pat. No. 2,984,628). This process is a very basic one. According to this U.S. Patent, it is claimed that the concentration of the sol should preferably be 0.1 to 2.0 mol/liter, the reaction is substantially completed within 1 to 4 hours, and a maximum concentration of 4 mol/liter is possible and a maximum reaction time of 10 hours is permissible. This U.S. patent, however, discloses nothing about the crystallizability, shape, and dispersibility of the resulting particles. In fact it describes nothing about the process of producing high dispersion sol or translucent gel thereof composed of supermicrocrystals smaller than 100 Å as disclosed in the present invention.

Being aware of the characteristic properties and usefulness of high dispersion sol of zirconia supermicrocrystals smaller than 100 Å, the present inventor carried out a series of research analyses, which led to the finding that there is an important region outside the scope of the above-mentioned U.S. Patent. The present invention was completed on the basis of this finding.

SUMMARY OF THE INVENTION

It is an object of the present invention to provide a high-dispersion sol or gel of monoclinic zirconia supermicrocrystals characterized in that it is translucent and contains monoclinic zirconia supermicrocrystals of uniform size and a rodlike shape or ellipsoidal shape having a diameter or width smaller than 100 Å, at a concentration higher than 0.1 mol/liter. The high-dispersion sol or gel of monoclinic zirconia supermicrocrystals according to the present invention has characteristic properties.

It is another object of the present invention to provide a process for producing a high-dispersion sol or gel of monoclinic zirconia supermicrocrystals of uniform size and rodlike shape or ellipsoidal shape having a diameter or width smaller than 100 Å, at a concentration higher than 0.1 mol/liter.

An embodiment of the process for producing the above-mentioned high dispersion sol or gel of monoclinic zirconia supermicrocrystals according to the present invention comprises adding water to a hydrated salt crystal composed mainly of zirconyl chloride in an amount of 400 ml or less for 1 gram atom of zirconium, to give a clear or sherbetlike mixture, subjecting the mixture to hydrothermal treatment in a closed container at more than 130° C. for more than 24 hours, to give a white pasty product, diluting the pasty product with water so that the concentration decreases below 1 mol/liter as zirconium, adjusting the pH to 3 to 7, and finally concentrating the diluted product.

Another embodiment of the process according to the present invention comprises subjecting an aqueous solution containing more than 1.5 mol/liter of zirconium salt or hydroxide in terms of zirconium and having such a composition as to give more than 3 mol/liter of hydrochloric acid after hydrolysis, to hydrothermal treatment in a sealed container at more than 130° C. for more than 24 hours, to give a white pasty product, diluting the pasty product with water so that the concentration decreases below 1 mol/liter as zirconium, adjusting the pH to 3 to 7, and finally concentrating the diluted product.

According to the invention, the process starts with a clear or sherbetlike mixture or an aqueous solution containing more than 1.5 mol/liter of zirconium and having a high chloride concentration. This concentration of zirconium and chloride is much higher than the one known before. Aggregate of supermicrocrystals is synthesized by hydrothermal treatment for an extremely long time. More specifically, the hydrothermal treatment is carried out at 130° C. or above for more than 24 hours. This heat treatment has never been attempted before. The resulting pasty product is not a peptized sol but is a turbid opaque substance.

The present inventor has discovered the nature of the thus obtained substance for the first time. According to X-ray diffractometry, the substance is composed of monoclinic zirconia crystals. Observation with a transmission electron microscope indicates that the zirconia crystals are rodlike particles having a diameter or width smaller than 100 Å. This size is the smallest which has ever been obtained. The effect of the high concentration of zirconium and chloride and long-time heat treatment is not clear. It is considered, however, that the high concentration of zirconium and chloride is responsible for the formation of a large number of crystal nuclei of $ZrO_2$ and the formation of concentrated hydrochloric acid. And the prolonged heating promotes the dissolution of the crystal grain boundary and the growth of isolated crystal grains, ending up with the formation of supermicrocrystals of extremely fine and uniform rodlike shape or ellipsoidal shape.

The second step of the process of the invention consists of diluting the resulting pasty product, adjusting the diluted liquid to pH 3–7, and concentrating the liquid. Concentration without pH adjustment does not provide the high-dispersion sol or gel of super-microcrystals.

The above and other objects, features and advantages of the present invention is more apparent from the following descriptions.

DETAILED DESCRIPTION OF THE INVENTION

The high-dispersion sol or gel of monoclinic zirconia supermicrocrystals of the present invention is translucent and contains monoclinic zirconia super-microcrystals of uniform size and rodlike shape or ellipsoidal shape having a diameter or width smaller than 100 Å, at a concentration higher than 0.1 mol/liter.

It should be noted that monoclinic zirconia supermicrocrystals may consist of $ZrO_2$ or contain $ZrO_2$ with a small amount, usually 0.3 to 5% by weight, of other metal oxides such as $HfO_2$ in the form of a solid solution.

The high-dispersion sol or gel of monoclinic zirconia supermicrocrystals defined above is produced by the following process.

Firstly, a clear or sherbetlike mixture of water and a hydrated salt crystal composed mainly of zirconyl chloride or an aqueous solution of zirconium salt or oxide and hydrochloric acid is prepared as a starting material.

The clear or sherbetlike mixture is prepared by adding water to a hydrate salt crystal composed mainly of zirconyl chloride in an amount of 400 ml or less, preferably 40 to 350 ml, for 1 gram atom of zirconium.

The aqueous solution of zirconium salt or hydroxide and hydrochloric acid is prepared by adding and dissolving more than 1.5 mol/liter, preferably 1.5 to 7 mol/liter, of zirconium salt or zirconium hydroxide in terms of zirconium to a hydrochloric acid solution so that the resulting aqueous solution has more than 3 mol/liter, preferably 3 to 9 mol/liter, of hydrochloric acid after hydrolysis. The zirconium salt may include zirconyl chloride, zirconium carbonate, zirconium nitrate, zirconium sulfate and zirconium acetate. The above zirconium salts and zirconium hydroxide may use singly or in combination with two or more.

As described above, the process according to the invention starts with a clear or sherbetlike mixtuure or an aqueous solution containing more than 1.5 mol/liter of zirconium and having a high chloride concentration. If the zirconium content in the mixture or aqueous solution is smaller than 1.5 mol/liter, the zirconia particles may be agglomerated and therefore the high-dispersion sol or gel of monoclinic zirconia super-microcrystals according to the present invention cannot be obtained.

The first step of the process of the invention comprises heating the above clear or sherbetlike mixture or the aqueous solution in a sealed container at more than 130° C., preferably 130° to 300° C., more preferably 180° to 270° C. for more than 24 hours, preferably 1 to 10 days as a hydrothermal treatment to obtain a white pasty product. In this hydrothermal treatment, if the temperature is lower than 130° C., the zirconia particles may be agglomerated because of low reaction velocity. Moreover, if the treating time is shorter than 24 hours, the reaction may not be completed and therefore the high-dispersion sol or gel of zirconia supermicrocrystals cannot be obtained.

The second step of the process of the invention includes diluting step and pH adjusting step. More specifically, the resulting white pasty product is diluted with water so that the concentration is lower than 1 mol/liter, preferably 0.1 to 0.5 mol/liter, in terms of zirconium and the diluted sol is adjusted to pH 3 to 7. If the zirconium content in the diluted sol is larger than 1 mol/liter, deflocculation will not occur because of high viscosity of the diluted sol. The thus obtained diluted sol usually has a pH of less than 1. The pH adjustment of the diluted sol may be carried out by removing hydrochloric acid from the diluted sol, for example, by means of ion exchange, dialysis or ultrafiltration. The pH adjustment may also be carried out by adding a pH adjusting agent such as ammonium hydroxide, alkali metal or alkali earth metal hydroxide, or basic amines to the diluted sol. If the pH adjustment is omitted or if the diluted sol after pH adjustment has a pH of lower than 3, the agglomerated particles will occur and therefore the high-dispersion sols or gel according to the invention cannot be obtained.

Finally, the diluted and pH-adjusted sol or product is concentrated so that the resulting product has higher than 0.1 mol/liter of zirconia. It should be noted a product having a zirconia content of lower than about 1 mol/liter may be in a sol state. On the other hand, a product having a zirconia content of higher than about 1 mol/liter may be in a gel state. In order to obtain gel, the concentration may be carried out by heating, especially radio frequency heating the diluted and pH-adjusted sol or product in such a manner that gel film is not formed on the surface of the peptized sol particles. In general, the temperature may be in the range of 60° to 100° C., particularly 80° to 100° C.

The thus obtained product is a high-dispersion sol or gel of monoclinic zirconia supermicrocrystals characterized in that it is translucent and contains monoclinic zirconia supermicrocrystals of uniform size and a rodlike shape or ellipsoidal shape having a diameter or width smaller than 100 Å, at a concentration higher than 0.1 mol/liter.

The sol or gel of the present invention is composed of monodisperse supermicrocrystals of monoclinic zirconia having a rodlike shape or ellipsoidal shape smaller than 100 Å in diameter or width. These supermicrocrystals of monoclinic zirconia are capable of uniformly mixing with other liquids or powdery substances. Zirconia particles in the mixture are not only dispersed uniformly but also dispersed such that they have an extremely large contact area. For this reason, they are highly reactive and readily form zirconia solid solutions and zirconium compounds upon heating at low temperatures. This sol of isolated monodisperse supermicroparticles has the lowest viscosity among the sols of the same particle size, and it provides upon concentration and solidification a gel of the highest uniformity. Once the sol is dried and made into a gel, the supermicrocrystals of rodlike shape or ellipsoidal shape form a comparatively firm and extremely stable polycrystal substance which does not swell in water and disperse again. In addition, they have extremely small pores and translucent porous body in the dry state. The gel can be uniformly densified at about 900° C., which is the lowest temperature among different kinds of zirconia, without any sintering auxiliary and additive.

Because of the above-mentioned characteristic properties, the sol or gel of the present invention will find use as a flame-retardant, an anti-static agent for textile products, a paint additive and a catalyst carrier. In addition to these common uses, it will also find important use as a raw material and additive of fine ceramics and a raw material for synthesis. The sol can be made into lead zirconate titanate for piezoelectric ceramic at an extremely low temperature. This reduces the evaporation of lead which poses an environmental problem.

Additional usages include a grain growth inhibitor for ceramics and a nucleating agent for crystallized glass. Finally, the high dispersion zirconia of supermicroparticles is most suitable as a raw material for delicately shaped ceramics such as film and fiber and the edge of a blade.

The invention is now described in more detail with reference to the following examples although the invention is not limited to the examples.

EXAMPLE 1

To 130 g of reagent grade zirconyl chloride ($ZrOCl_2.8H_2O$) about 25 ml of distilled water was added to give a sherbetlike mixture. This mixture was sealed in a polytetrafluoroethylene container and heated for hydrothermal treatment in an autoclave at 200° C. for 5 days. There was obtained a white pasty product. The pasty product was diluted to about 2 liters with distilled water so as to bring about dispersion and peptization. The resulting diluted sol had a pH of about 1. The diluted sol was treated with ion-exchange resin to raise the pH value to 6. The resulting sol was found to be almost completely peptized and translucent, and its transmitted light assumed an orange color. Upon examination by powder X-ray diffractometry, the dried product of the sol exhibited the peak of monoclinic zirconia. Observation under a transmission electron microscope indicated that the particles constituting the sol are uniform, monodisperse microcrystals of rodlike shape about 40 Å in diameter and about 100 Å long. The sol was concentrated by heating at about 100° C. with a microwave oven in such a manner that a gel film is not formed on the surface of the peptized sol particles. The sol remained a translucent fluid until the concentration reached about 1 mol/liter in terms of zirconium. Upon further concentration, it became a translucent pasty material at a concentration of about 1.5 mol/liter. It finally became a gel when concentrated to about 4 mol/liter; but the gel was still translucent.

EXAMPLE 2

An aqueous solution containing about 2 mol/liter (as Zr) of zirconiumm hydroxide and about 4 mol/liter of hydrochloric acid was sealed in a polytetrafluoroethylene container. After heating at 200° C. for 1 week, the resulting product underwent dilution, ion exchange, and concentration in the same manner as in Example 1. Almost the same product as in Example 1 was obtained.

What is claimed is:

1. A high-dispersion product which comprises: a sol or gel of isolated monoclinic zirconia microcrystals dispersed in an aqueous solution without agglomeration at a concentration of 0.1 to 1 mol/liter, wherein said monoclinic zirconia microcrystals have uniform size, and a diameter or width smaller than 100 angstroms, and wherein said sol or gel is translucent.

2. The high-dispersion product as defined in claim 1, wherein said product is a sol.

3. The high-dispersion product as defined in claim 1, wherein said product is a gel.

4. A process for producing a high-dispersion product which is a sol or gel of monoclinic zirconia microcrystals which comprises:
   adding water to hydrated salt crystal composed mainly of zirconyl chloride in an amount of 400 ml or less per 1 gram atom of zirconium so as to produce a mixture;
   subjecting said mixture to hydrothermal treatment in a sealed container at more than 130° C. for more than 24 hours to produce a white pasty product;
   diluting said white pasty product with water so that the zirconium concentration decreases below 1 mol/liter to produce a diluted product;
   adjusting the pH of said diluted product to 3 to 7; and
   concentrating said diluted product to obtain a high-dispersion product which comprises a sol or gel of isolated monoclinic zirconia microcrystals dispersed in an aqueous solution without agglomeration at a concentration of 0.1 to 1 mol/liter, wherein said monoclinic zirconia microcrystals have uniform size, and a diameter or width smaller than 100 angstroms, and wherein said sol or gel is translucent.

5. The process as defined in claim 4, wherein a high-dispersion sol is produced.

6. The process as defined in claim 4, wherein a high-dispersion gel is produced.

7. The process as defined in claim 4, wherein said water is in an amount of 40 to 350 ml per 1 gram atom of zirconium.

8. The process as defined in claim 4, wherein said mixture is subjected to hydrothermal treatment at 180° to 270° C. for 1 to 10 days.

9. The process as defined in claim 4, wherein said white pasty product is diluted so that the zirconium concentration decreases to 0.1 to 0.5 mol/liter.

10. The process as defined in claim 4, wherein said obtained high-dispersion product is a sol and wherein said sol is concentrated by heating in the range of 80° to 100° C. to produce a gel.

11. A process for producing a high-dispersion product which is a sol or gel of monoclinic zirconia microcrystals which comprises:
   subjecting to hydrothermal treatment in a sealed container an aqueous solution which contains more than 1.5 mol/liter of zirconium salt or hydroxide based on zirconium concentration and having such a composition as to produce more than 3 mol/liter of hydrochloric acid after hydrolysis, said hydrothermal treatment being conducted at more than 130° C. for more than 24 hours so as to produce a white pasty product;
   diluting said white pasty product with water so that the zirconium concentration decreases below 1 mol/liter to produce a diluted product;
   adjusting the pH of said diluted product to 3 to 7; and
   concentrating said diluted product to obtain a high dispersion product which comprises a sol or gel of isolated monoclinic zirconia microcrystals dispersed in an aqueous solution without agglomeration at a concentration of 0.1 to 1 mol/liter, wherein said monoclinic zirconia microcrystals have uniform size, and a diameter or width smaller than 100 angstroms, and wherein said sol or gel is translucent.

12. The process as defined in claim 11, wherein a high-dispersion sol is produced.

13. The process as defined in claim 11, wherein a high-dispersion gel is produced.

14. The process as defined in claim 11, wherein said aqueous solution contains 1.5 to 7 mol/liter of zirconium salt or hydroxide based on zirconium concentration and has such a composition as to produce 3 to 9 mol/liter of hydrochloric acid after hydrolysis.

15. The process as defined in claim 14, wherein said zirconium salt comprises a member selected from the group consisting of zirconyl chloride, zirconium carbonate, zirconium nitrate, zirconium sulfate, zirconium acetate, and mixtures of two or more thereof.

16. The process as defined in claim 11, wherein said hydrothermal treatment is conducted at 180° to 270° C. for 1 to 10 days.

17. The process as defined in claim 11, wherein said white pasty product is diluted so that the zirconium concentration decreases to 0.1 to 0.5 mol/liter.

18. The process as defined in claim 11, wherein said obtained high-dispersion product is a sol and wherein said sol is concentrated by heating in the range of 80° to 100° C. to produce a gel.

* * * * *